United States Patent
Kakou et al.

(10) Patent No.: US 9,894,259 B2
(45) Date of Patent: Feb. 13, 2018

(54) MOVABLE IMAGE CAPTURE DEVICES AND METHODS FOR CAPTURE OF IMAGES FROM BEHIND A DISPLAY SCREEN

(71) Applicant: Lenovo Enterprise Solutions (Singapore) Pte. Ltd., New Tech Park (SG)

(72) Inventors: Jacob Kakou, Cary, NC (US); Daniel M. Ranck, Apex, NC (US); Nusrat Sherali, Durham, NC (US); Suresh K. Thapa, Morrisville, NC (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 14/754,640

(22) Filed: Jun. 29, 2015

(65) Prior Publication Data
US 2016/0381275 A1 Dec. 29, 2016

(51) Int. Cl.
| | |
|---|---|
| H04N 5/232 | (2006.01) |
| H04N 7/14 | (2006.01) |
| G06T 7/70 | (2017.01) |
| G06K 9/00 | (2006.01) |

(52) U.S. Cl.
CPC ........... *H04N 5/23203* (2013.01); *G06T 7/70* (2017.01); *H04N 5/23293* (2013.01); *H04N 7/144* (2013.01); *G06K 9/00228* (2013.01)

(58) Field of Classification Search
CPC ...... H04N 5/23293; H04N 7/14–7/157; H04N 5/23264–5/23287; G06F 1/1605; G06F 1/1637; G06F 1/1686; G03B 2205/0007–2205/0038; G03B 5/00–5/08; G06T 5/003; G06T 5/004
See application file for complete search history.

(56) References Cited

U.S. PATENT DOCUMENTS

| | | | | |
|---|---|---|---|---|
| 5,619,254 A | * | 4/1997 | McNelley | H04N 7/144 348/14.08 |
| 5,815,197 A | * | 9/1998 | Kakii | H04N 7/144 348/14.08 |
| 2009/0278913 A1 | * | 11/2009 | Rosenfeld | H04N 7/144 348/14.16 |
| 2009/0322895 A1 | * | 12/2009 | Miyata | H04N 1/2145 348/222.1 |

(Continued)

OTHER PUBLICATIONS

Spear, Zach, Apple files patent for camera hidden behind display, dated Jan. 8, 2009, URL: http://appleinsider.com/articles/09/01/08/apple_files_patent_for_camera_hidden_behind_display.

(Continued)

*Primary Examiner* — Paul Berardesca
(74) *Attorney, Agent, or Firm* — Olive Law Group, PLLC (57) ABSTRACT

Movable image capture devices and methods for images from behind a display screen are disclosed. According to an aspect, a method includes determining a position of a displayed target image on a display screen. The method also includes using an image capture device positioned behind the display screen for capturing images positioned in front of the display screen. The method also includes moving the image capture device behind the display screen to a position near the position of the displayed target image based on the determined position of the displayed target image.

16 Claims, 5 Drawing Sheets

(56) References Cited

U.S. PATENT DOCUMENTS

| | | | | |
|---|---|---|---|---|
| 2011/0102538 A1* | 5/2011 | Tan | ............ | H04N 7/144 348/14.08 |
| 2012/0140017 A1* | 6/2012 | Hong | ............ | H04N 7/144 348/14.1 |
| 2012/0169838 A1* | 7/2012 | Sekine | ............ | H04N 7/15 348/14.16 |
| 2012/0257004 A1* | 10/2012 | Smith | ............ | H04N 7/144 348/14.16 |
| 2014/0218467 A1* | 8/2014 | You | ............ | H04N 7/142 348/14.16 |
| 2015/0373303 A1* | 12/2015 | Visosky | ............ | G06K 9/00281 348/14.05 |
| 2016/0050391 A1* | 2/2016 | Schultz | ............ | H04N 7/144 348/14.07 |
| 2016/0080633 A1* | 3/2016 | Hong | ............ | H04N 5/23212 348/169 |

OTHER PUBLICATIONS

Springer, Gaze Detection System by Wide and Auto Pan/Tilt Narrow View Camera, Lecture Notes in Computer Science, vol. 2781, 2003, pp. 76-83.

Teleprompter, Wikipedia, URL: http://en.wikipedia.org/wiki/Teleprompter, Jun. 1, 2015.

* cited by examiner

MOVABLE IMAGE CAPTURE DEVICES AND METHODS FOR CAPTURE OF IMAGES FROM BEHIND A DISPLAY SCREEN

TECHNICAL FIELD

The presently disclosed subject matter relates to a movable imaging device. More specifically, the presently disclosed subject matter relates to systems and methods for a movable imaging device positioned behind a display configured for transparency.

BACKGROUND

Video conferencing or videotelephony on laptop computers, desktop computers, tablet computers, smart phones, or other computing devices is very useful and becoming more common. Such video conferencing services are provided through the use of applications, such as SKYPE® software and Apple Inc.'s FACETIME® software. Typically, computing devices will include a digital camera, mounted or otherwise positioned on top of or near its display. A user will be positioned in front of the display for interacting with the computing device and for seeing one or more other users involved in the video conference and that are shown on the display. While the user is watching the other video conferencing participants, the image capture device is capturing his or her image. In captured images displayed on the other participant's computing device, it appears that the user is looking away, because the user is looking at his or her display screen, not the image capture device. Although the user may sometimes look at the image capture device, this can create an awkward exchange in which the user is periodically looking at the camera and the other party. This problem is made even worse in a larger scale video conferencing session with multiple participants. In this case, the camera and screen may be even further away, increasing the disconnection between video chat participants.

In view of the foregoing, there is a need for improved techniques for video conferencing.

SUMMARY

Movable image capture devices and methods for capture of images from behind a display screen are disclosed. According to an aspect, a method includes determining a position of a displayed target image on a display screen. The method also includes using an image capture device positioned behind the display screen for capturing images positioned in front of the display screen. The method also includes moving the image capture device behind the display screen to a position near the position of the displayed target image based on the determined position of the displayed target image.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executables of an identified device need not be physically located together, but may comprise disparate instructions stored in different locations which, when joined logically together, comprise the device and achieve the stated purpose of the device.

An executable code of a device may be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be a mobile computing device such as, for example, but not limited to, a smart phone, a cell phone, a pager, a personal digital assistant (PDA), a mobile computer with a smart phone client, or the like. A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on smart phone, the examples may similarly be implemented on any suitable computing device, such as a computer.

As referred to herein, the term "user interface" is generally a system by which users interact with a computing device. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

Further, as used herein, the term "memory" is generally a storage device of a computing device.

As referred to herein, the term "image capture device" refers to any suitable device or component configured to capture one or more images and/or video. For example, an image capture device may be a digital camera integrated with a computing device. The digital camera may capture an image or video of a scene positioned in front of the camera. The digital camera may generate image or video data and suitably store the data in memory of the computing device.

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the term "target image" refers to any portion of an image displayed on a display that is a focal point for a viewer. For example, during a video conference, a displayed speaker may be the focal point. In another example of a video conference, a host may be considered a target image when there are multiple people being displayed at the same time. In yet another example of a video conference when there are multiple people, the person who initiates a conversation may be considered the target image.

Figure 1:
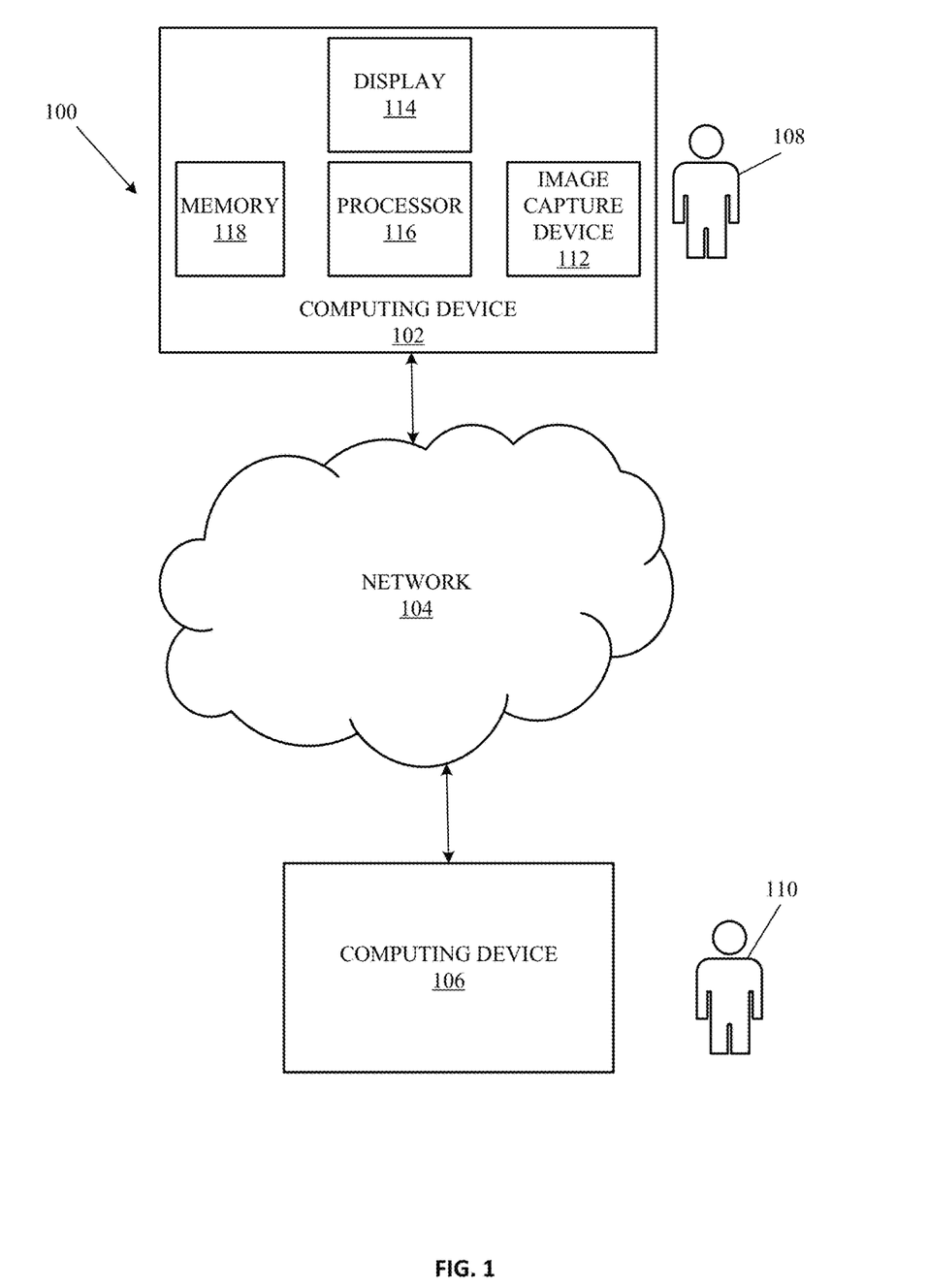
FIG. 1 is a block diagram of an example system in accordance with embodiments of the present disclosure.

The present disclosure is now described in more detail. For example, FIG. 1 illustrates a block diagram of an example system 100 in accordance with embodiments of the present disclosure. In this example, a computing device 102 may be communicatively connected to one or more other computing devices via a communications network 104, which may be any suitable local area network (LAN), either wireless (e.g., BLUETOOTH® communication technology) and/or wired. Alternatively, the communications network 104 may be the Internet or any other suitable type of network. For example, the computing device 102 may be communicatively connected to another computing device 106. The computing devices 102 and 106 may exchange data, such as image and/or video data, as will be understood to those of skill in the art. For example, a user 108 of the computing device 102 and a user 110 of the computing device 106 may be engaged in a video conference with each other. Video data captured during the video conference and any other data may be communicated between the computing devices.

During video conferencing, an image capture device 106 of the computing device 102 may be positioned behind the display screen of a display 114 for capturing images of objects and scenery positioned in front of the display screen. The captured images may include the user 108 (e.g., a head and shoulders) and surrounding objects. Data of the captured images and/or video may be suitably communicated by the computing device 102 to the other computing device 106 for display on the computing device 106. Likewise, the computing device 106 may capture images or video of the user 110 and communicate the captured images or video to the computing device 102 for display by the display 114.

Additionally, the computing device 102 may include an integrated microphone (not shown) for the capture of audio associated with the captured images or video. The captured audio data may be communicated to the other computing device 106. The computing device 102 may combine the one or more still images, video and/or associated audio to create multimedia data for communication to the computing device 106.

The computing devices 102 and 106 may include any suitable input devices (not shown) for receiving user input for communication to the other computing device during video conferencing. For example, user input may be received via a touch screen, a mouse, a smart phone or any other electronic device configured for receiving input whether from tactile or coded input.

The computing device 102 may include a processor 116 and memory 118 for implementing the functionality disclosed herein. As an alternative, the computing device 102 may include any suitable hardware, software, and/or firmware for implementing the functionality disclosed herein.

Figure 2:
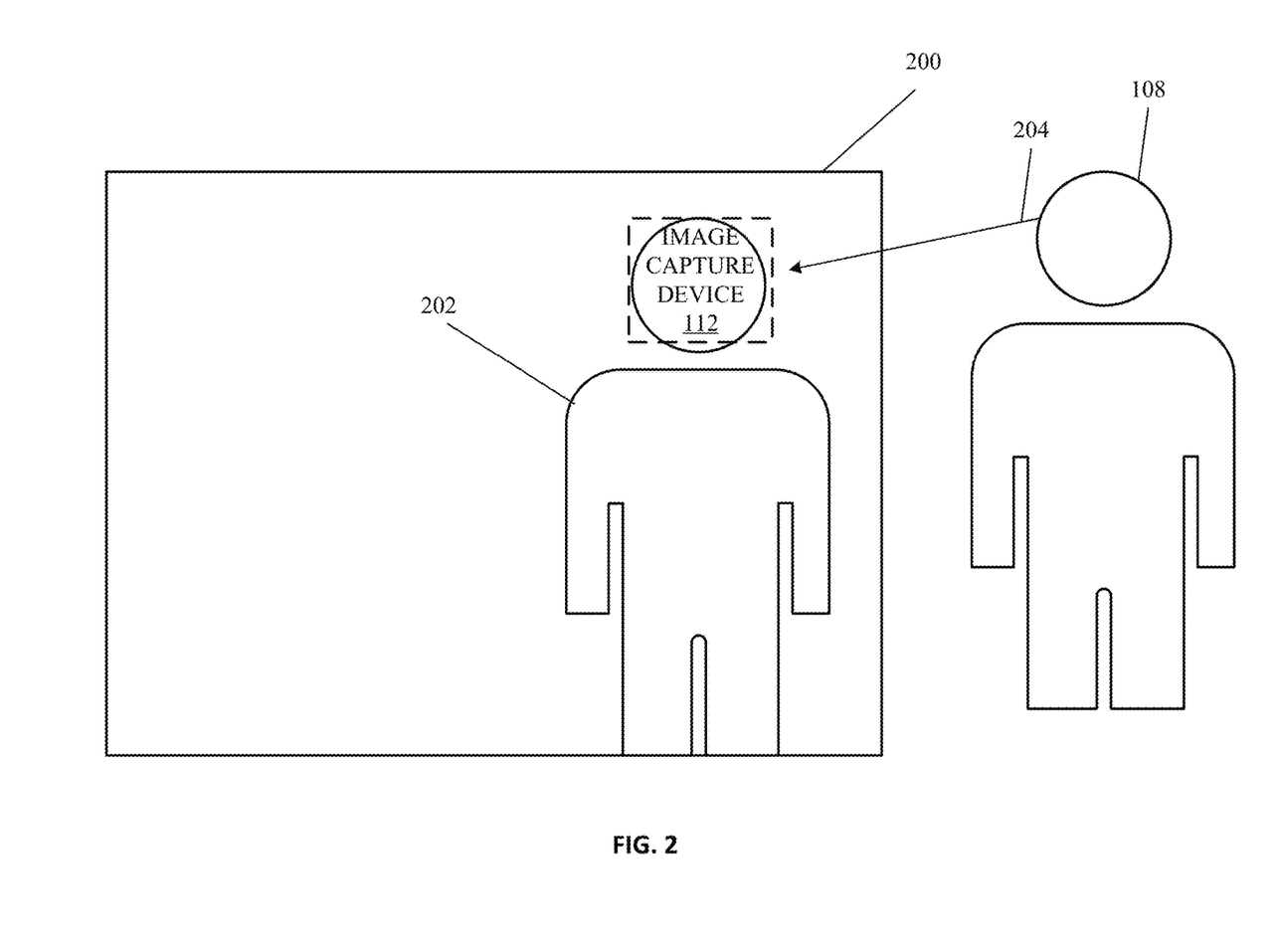
FIG. 2 is a schematic diagram depicting placement a display screen, a displayed target image on the display screen, and an image capture device positioned behind the display screen in accordance with embodiments of the present disclosure.

FIG. 2 illustrates a schematic diagram depicting placement a display screen 200, a displayed target image 202 on the display screen 200, and an image capture device 112 positioned behind the display screen 200 in accordance with embodiments of the present disclosure. Referring to FIG. 2, the user 108 is positioned in front of the display screen 200 for viewing images and video displayed on the display screen 200. The image capture device 112 is positioned behind the display screen 200 (i.e., a side of the display screen 200 that opposes the user 108). The display screen 200 may be transparent (or semi-transparent) either entirely or at a portion thereof for capturing images or video of the user 108 and other objects.

The image capture device 112 is configured to be movable behind the display screen 200 to a position of the displayed target image 202. For example, the image capture device 112 may be moved by suitable motorized components (not shown). The computing device may use its hardware, software, and/or firmware (e.g., one or more processors and memory) to determine a position of the displayed target image 202 on the display screen 200. The image capture device 112 may be moved behind the display screen 200 to a position near the position of the displayed target image 202 based on the determined position of the displayed target image 202. For example as shown in FIG. 2, the target image 202 is a person, and the image capture device 112 is positioned at about the location of the face of the person. In this example, it is known that the user 108 will be viewing the other person's face and his or her eyes will be pointing in the direction indicated by arrow 204. In this way, it will appear to a viewer that the user 108 is looking directly at the image capture device 112, because it will be placed behind the person's head in the displayed image. The image capture device 112 can be moved to be behind the person's head as the person's head is moved over time.

Figure 3:
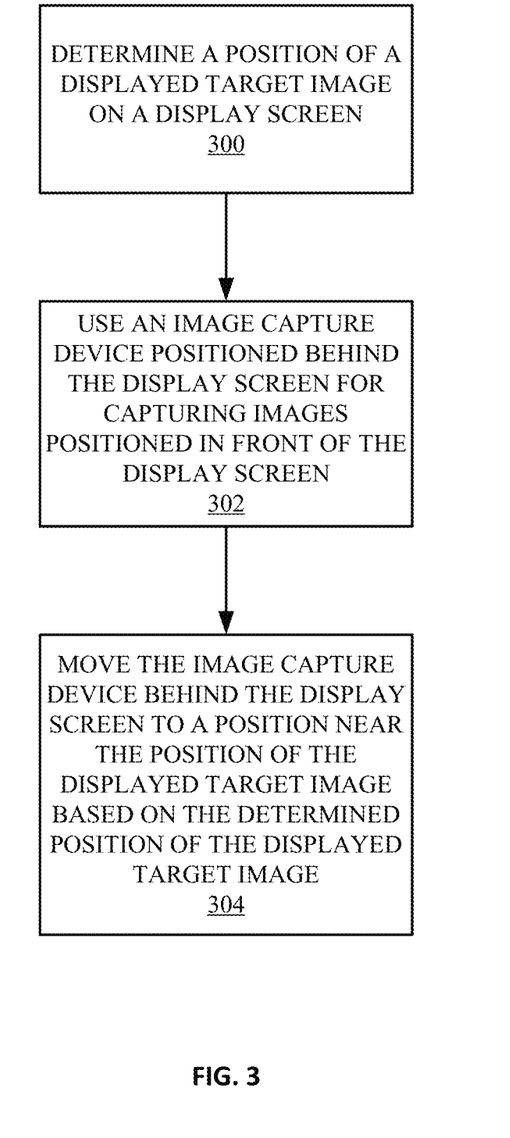
FIG. 3 is a flow chart of an example method for capturing images using an image capture device positioned behind a display screen in accordance with embodiments of the present disclosure.

FIG. 3 illustrates a flow chart of an example method for capturing images using an image capture device positioned behind a display screen in accordance with embodiments of the present disclosure. In this example, the method is described as being implemented by the system 100 shown in FIG. 1, although it should be understood that the method may alternatively be implemented by any other suitable system or computing device.

Referring to FIG. 3, the method 300 includes determining 302 a position of a displayed target image 202 on a display screen. For example, the computing device 102 shown in FIG. 1 may determine a position of a displayed target image, such as the target image 202. In an example, a suitable image analysis technique may be implemented to determine a face, mouth, eyes or even other target image of interest. The image analysis may result in a coordinate or a set of coordinates defining an area of interest in the display area of the display screen 200. The coordinates may represent a specific or general region of interest identifying a target image. The coordinates may also represent an outline of the target image. Further, the coordinates may be an average or other predetermined calculation of the coordinate(s) 132 which may determine an area used by the system.

The method of FIG. 3 also includes using 302 an image capture device positioned behind the display screen or a display area for capturing images positioned in front of the display screen or display area. For example, the computing device 102 may control the image capture device 112 to a position behind the target image 202 as shown in FIG. 2.

Further, the method of FIG. 3 includes moving 304 the image capture device behind the display screen to a position near the position of the displayed target image based on the determined position of the displayed target image. For example, the computing device 102 may control the image capture device 112 to be positioned behind the target image based on a coordinate or set of coordinates calculated by image analysis or received from the image capture device 112. Further, the computing device 102 may determine the determined position of the displayed target image by application of any image recognition technique suitable for determining a position of a face of a person within an image or set of images.

In accordance with embodiments of the present disclosure, a display screen may be controlled to be substantially or entirely transparent at a position of the image capture device or displayed target image. Further, the size and shape of the area may be controlled to be the same or similar to a projection area of the image capture device. The size and shape of the transparent area may be based on one or more factors. The factors may, but are not limited to, a size of the target image, a speed of movement of the target image 130, foreground or background lighting surrounding the display screen or any other factor that may impact the quality of image recorded by the image capture device. As an example, the size of the transparent area may vary based on the lighting characteristics around the image capture device and/or the size of the targeted image. The coordinates and/or the size of the transparent area may also be based on audio analysis of the multimedia data including both audio and video data captured by the image capture device. The display screen may become transparent by making the display elements corresponding to the coordinates inactive. Audio analysis may be used to determine the position of a speaking source within the display area of the display screen.

In accordance with embodiments, multimedia data may include multiple, different images for display on a display screen. Audio and/or image analysis may be applied by the computing device 102 to determine a primary source of sound among the different images within a display area. The system 100 may subsequently move the image capture device 112 behind the display screen 200 and an associated transparent area of the display screen to a position near the primary source of sound in the image within the display area of the display screen 200. Further, for example, the computing device 102 may determine target image movement within the display area and control the image capture device 112 to move. As an example, if the target image moves from the left side of the display area to the right side, the image and/or audio analysis may determine this movement and subsequently move, at varying speeds or in a delayed fashion, the image capture device 112 to the new position of the target image. The computing device 102 may also determine the primary source of sound from among several potential target images to identify the primary source of sound. As an example, the image may show the faces of several people participating in a video conference. Each of the several people may be physically in front of a display screen associated with a computing device 102. A video conference application may be used to combine the individual video feeds from each one of multiple, image capture devices associated with each of the several people participating in the video conference displaying the combined image(s) on each of the participant's display screens. As an example, audio and/or image analysis may be applied to determine which one of the several target images associated with each of the people participating in the video conference call is the primary source of audio. The computing device 102 may subsequently move the image capture device in any given display screen to a transparent area behind the face of the primary speaker or the primary source of audio. The face of the primary speaker being the target image, as an example. The system 100 may also include moving the image capture device 124 as a result of a different one of the several potential target images determined to be a new primary source of sound. The computing device 102 may also determine the rate of movement of the displayed target image on the display screen. The computing device 102 may subsequently control the display of video of the target image on the display screen based on the rate of movement. In this manner, the computing device 102 may reduce the motion effect of the displayed image while the image capture device is moving. As an example, the video may freeze for a second or two, or the video may fade in a manner that is not disruptive to the video conference taking place. Alternatively, the image capture device 112 may stay on and not fade out providing a continuous feed of video from the image capture device 112.

Figure 4:
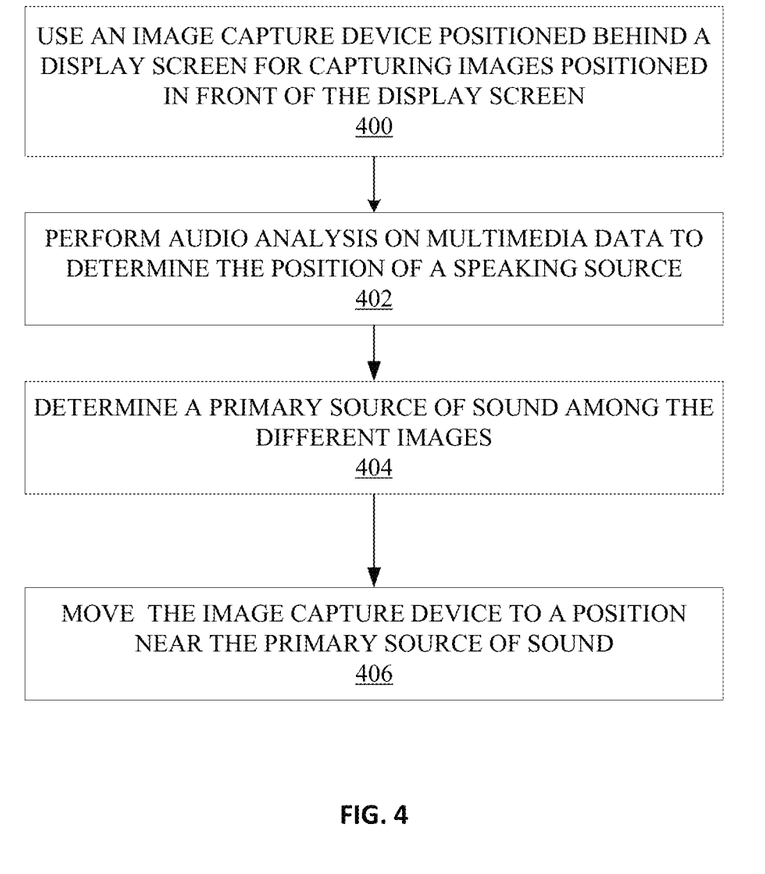
FIG. 4 is another example method for capturing images using an image capture device positioned behind a display screen in accordance with embodiments of the present disclosure.

FIG. 4 illustrates another example method for capturing images using an image capture device positioned behind a display screen in accordance with embodiments of the present disclosure. In this example, the method is described as being implemented by the system shown in FIG. 2, although it should be understood that the method may alternatively be implemented by any other suitable system or computing device.

The method of FIG. 4 includes using 400 an image capture device positioned behind a display screen for capturing images positioned in front of the display screen. For example, the image capture device 112 shown in FIG. 2 may be controlled to capture video of the user 108. Further, the display screen 200 shown in FIG. 2 may be used to display a video showing another user in which user 108 is engaged with a video conference. The method of FIG. 4 includes performing 402 audio and/or video analysis on multimedia data to determine the position of a primary speaking source among one or several target images. Continuing the aforementioned example, the computing device may analyze the multimedia data associated with the video conference to identify the target image 202, particularly the head of the person being shown on the display screen 200. The method includes determining 404 a primary source of sound among the different images.

The method of FIG. 4 includes moving 406 the image capture device to a position near the primary source of sound. Continuing the aforementioned example, the computing device can control a mechanism to move the image capture device 112 to a position associated with display screen coordinates of the target image 202.

Figure 5:
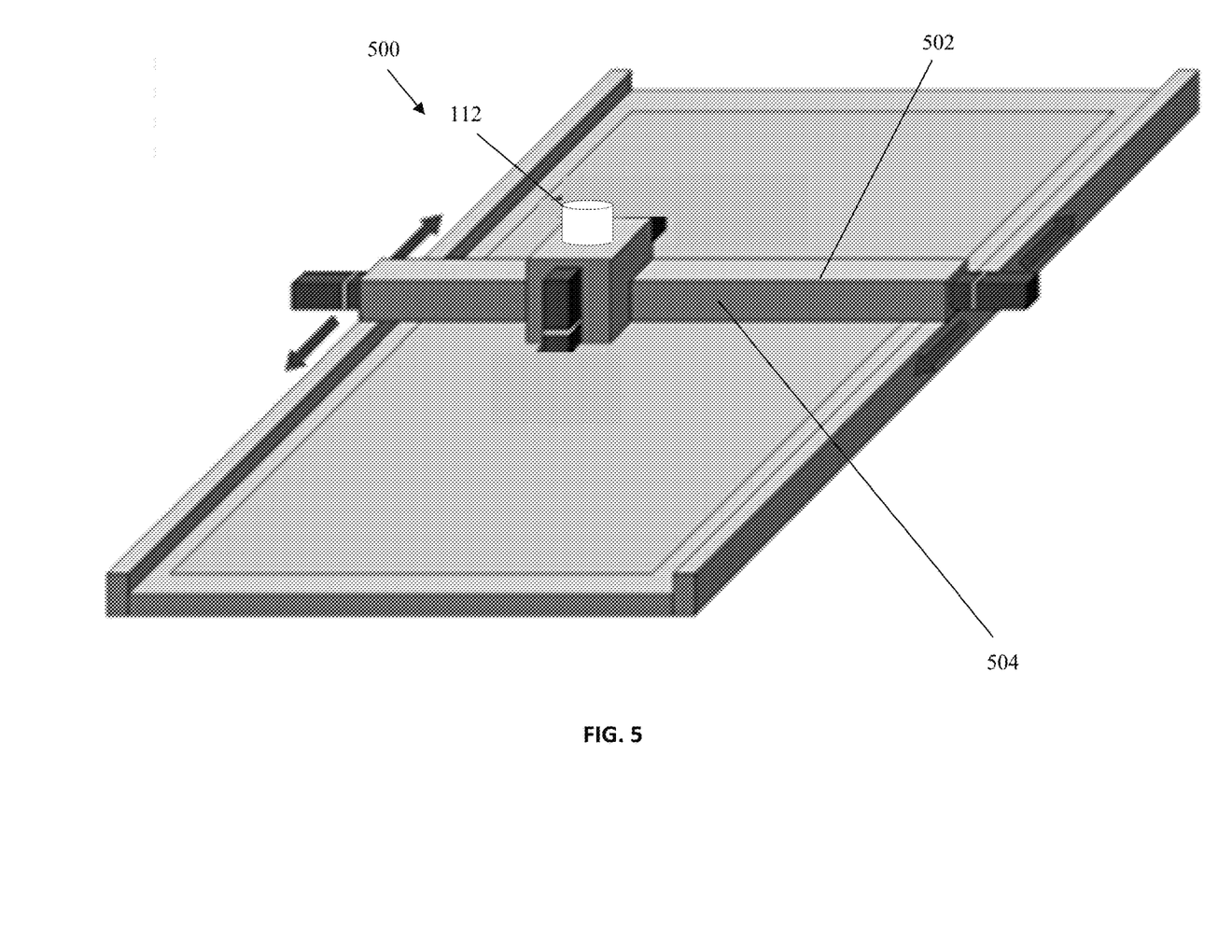
FIG. 5 is a perspective view of an example motorized assembly for positioning behind a display screen for movement of an image capture device in accordance with an embodiment of the present disclosure.

FIG. 5 is a perspective view of an example motorized assembly 500 for positioning behind a display screen for movement of an image capture device in accordance with an embodiment of the present disclosure. The assembly 500 may include a combination of components and controls for positioning the image capture device 112 at desired positions behind a display screen (not shown). In this example, the assembly 500 includes an x-bar 502 that can be controlled to be moved along a horizontal (or x-direction) of the display screen to thereby moved the attached image capture device 112 in the horizontal direction. Further, the assembly 500 includes a y-bar 504 that can be controlled to be moved along a horizontal (or y-direction) of the display screen to thereby moved the attached image capture device 112 in the vertical direction. The x-bar 502 and the y-bar 504 may be operatively connected to an eletromechanical motor or other suitable mechanism for controlling movement of the image capture device 112.

It is noted that the assembly 500 shown in FIG. 5 should be considered as an example mechanism for moving an image capture device, but should not be construed as limiting. For example, the image capture device may be move by a magnetic system or any other suitable system.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    determining a position of a displayed target image on a display screen;
    using an image capture device positioned behind the display screen that captures an image positioned in front of the display screen;
    moving the image capture device behind the display screen to a position near the position of the displayed target image based on the determined position of the displayed target image;

determining a rate of movement of the displayed target image on the display screen;

controlling display of video of the target image on the display screen based on the rate of movement; and reducing a motion effect of the displayed video of the target image while the image capture device is moving in accordance with the rate of movement.

2. The method of claim 1, further comprising receiving image data for displaying the target image on the display screen, and wherein determining the position of the displayed target image within a display area of the display screen is based on image analysis performed on the received image data from the image capture device.

3. The method of claim 2, wherein determining a position of the displayed target image comprises determining the position based on coordinate information in the image data.

4. The method of claim 1, wherein determining the position of the displayed target image comprises applying an image recognition technique for determining a position of a face of a person.

5. The method of claim 1, further comprising controlling the display screen to be substantially transparent at the position of the displayed target image.

6. The method of claim 1, wherein determining a position of the displayed target image comprises performing audio analysis on multimedia data to determine the position of a speaking source.

7. The method of claim 6, wherein the multimedia data includes sound data associated with a plurality of different images for display on the display screen, wherein the method further comprises determining a primary source of sound among the different images, and wherein moving the image capture device comprises moving the image capture device behind the display screen to a position near the primary source of sound.

8. The method of claim 1, further comprising:

determining that the displayed target image moves to another position on the display screen; and moving the image capture device behind the display screen to a position near the other position of the displayed target image.

9. A system comprising:

at least one processor and memory, wherein the memory includes instructions, which when executed by the processor, cause the system to:

determine a position of a displayed target image on a display screen;

use an image capture device positioned behind the display screen to capture images positioned in front of the display screen;

move the image capture device behind the display screen to a position near the position of the displayed target image based on the determined position of the displayed target image;

determine a rate of movement of the displayed target image on the display screen;

control display of video of the target image on the display screen based on the rate of movement; and reduce a motion effect of the displayed video of the target image while the image capture device is moving in accordance with the rate of movement.

10. The system of claim 9, further configured to receive image data for displaying the target image on the display screen, and determine the position of the displayed target image within the display area of the display screen based on image analysis performed on the image data received from the image capture device.

11. The system of claim 10, wherein the at least one processor and memory i-s further configured to determine the position of a displayed target object based on coordinate information in the image data.

12. The system of claim 9, wherein the at least one processor and memory is further configured to apply an image recognition technique to determine a position of a face of a person.

13. The system of claim 9, wherein the at least one processor and memory controls the display screen to be substantially transparent at the position of the displayed target image.

14. The system of claim 9, wherein the at least one processor and memory is further configured to perform audio analysis on multimedia data to determine the position of a speaking source.

15. The system of claim 14, wherein the multimedia data includes sound data associated with a plurality of different images for display on the display screen, wherein the system is further configured to determine a primary source of sound among the different images, and wherein the system is further configured to move the image capture device behind the display screen to a position near the primary source of sound.

16. The system of claim 9, wherein the at least one processor and memory:

determines that the displayed target image moves to another position on the display screen; and moves the image capture device behind the display screen to a position near the other position of the displayed target image.

* * * * *